United States Patent Office 3,758,413
Patented Sept. 11, 1973

3,758,413
TERBIUM ACTIVATED YTTRIUM SILICATE PHOSPHORS
Thomas E. Peters, Levittown, N.Y., assignor to
GTE Laboratories Incorporated
No Drawing. Continuation-in-part of abandoned application Ser. No. 640,354, May 22, 1967. This application Feb. 4, 1970, Ser. No. 8,718
Int. Cl. C09k *1/54*
U.S. Cl. 252—301.4 F         4 Claims

ABSTRACT OF THE DISCLOSURE

Terbium activated yttrium silicate phosphors which emit green light when excited by ultraviolet, cathode ray or X-ray radiation. The phosphors may be used in fluorescent lamps and in cathodoluminescent screens for cathode-ray tubes.

CROSS-REFERENCE TO RELATED APPLICATION

This application is a continuation-in-part of U.S. patent application Ser. No. 640,354 filed May 22, 1967, now abandoned.

BACKGROUND OF THE INVENTION

This invention relates to crystalline inorganic phosphor compositions which emit green light when exposed to cathode-ray, ultraviolet or X-ray radiation and more specifically, to terbium activated yttrium silicate phosphors.

Terbium is known as an element which is potentially useful in obtaining green emission under various types of excitation. For example, terbium activated yttrium oxide is known to fluoresce moderately under ultraviolet excitation and U.S. Pat. 3,373,302 states that silica glass fibers doped with terbium may be used as a green emitting light source that is free of phosphor materials. The Borchardt Pat. 3,250,722 discloses a large number of europium-activated rare earth solid solutions wherein the europium is associated with an oxygen-containing anion and some of these hosts, such as yttrium phosphate, are known to fluoresce when terbium is substituted for europium. However, it has been found that terbium in yttrium tungstate does not result in the appearance of terbium emission although europium activated yttrium tungstate is, according to Borchardt, particularly bright under ultraviolet excitation. Also, terbium activated $Y_2SiWO_8$ has been found not to fluoresce under ultraviolet or cathode-ray excitation, and terbium activated yttrium vanadate exhibits a relative luminosity less than 1.0 (as compared to 100 for europium activated yttrium vanadate) when excited by 253.7 nanometer radiation. Thus, it is not evident which of the many potential hosts for terbium activation will actually lead to the synthesis of useful green-emitting phosphors.

SUMMARY OF THE INVENTION

I have now discovered that strong emission in the green portion of the spectrum can be obtained by activating yttrium silicate with terbium. This new phosphor fluoresces under cathode ray and ultraviolet radiation making it suitable for use in cathode ray tubes of the type used in color television and in fluorescent lamps. More specifically, the present invention comprises a phosphor system consisting essentially of compositions defined by the formula $(Y_2O_3)_y(SiO_2)_x$:Tb, where the ratio of $x$ to $y$ is in the range 1 to 3. The concentration of the terbium activator is between 0.25 and 15 atomic percent of the yttrium content of the phosphor.

In synthesizing these phosphors, yttrium oxide or yttrium nitrate is blended with silicon dioxide, yttrium fluoride and terbium oxide. The yttrium fluoride acts as a mineralizer, other fluoride salts such as ammonium fluoride also being suitable for mineralization. The optimum fluoride ion concentration has been found to lie in the range 0.4 to 1.2 moles per mole of $SiO_2$. It also has been found that a slight excess of silica over that required for stiochiometry is desirable for synthesis of the most efficient phosphors.

The brightest and most efficient of the phosphors is obtained when $x/y$ is approximately 1.0 and the amount of terbium substituted for yttrium is approximately 7 atomic percent. This phosphor $Y_2SiO_5$:Tb has an emission under electron beam excitation which is in the green region of the spectrum and aluminosity approximately two-thirds that of one of the brightest green-emitting cathodoluminescent phosphors, silver activated zinc-cadmium sulfide. Similar results are obtained when its photoluminescence is compared under ultraviolet excitation with manganese activated zinc silicate.

DESCRIPTION OF THE PREFERRED EMBODIMENTS

Example I 3.75 grams of yttrium oxide $Y_2O_3$, 0.584 grams yttrium fluoride $YF_3$, 0.513 gram terbium oxide $Tb_2O_3$ and 1.44 grams silicon dioxide $SiO_2$ were dry blended at room temperature, placed in an uncovered quartz crucible and fired at 1300° C. for at least four hours. After firing, the powder was removed and allowed to cool to room temperature. The sample was then mortared and sieved through a 325 mesh screen.

The resultant phosphor $Y_2SiO_5$:Tb, in which 7.0 atomic percent of Tb was substituted for yttrium, emits strongly in the green when excited by a low pressure mercury lamp, X-rays or cathode rays. The cathodoluminescent emission spectra is dominated by a group of lines occurring between 540 and 560 nanometers. Line groups of lesser magnitude occur in the ranges 480–510, 580–600 and 615–640 nanometers.

Example II

The effect of changes in the terbium concentration was established by preparing by the method of Example I several batches of phosphors wherein the ratio of $x$ to $y$ was maintained at 1.2 and the terbium concentration varied between 1 and 15 atomic percent. The relative brightness under cathode ray and ultraviolet excitation are shown in Table I using the brightness of the phosphor containing 10 atomic percent terbium as a standard.

TABLE I

| Tb (atomic percent) | Relative brightness (percent) | |
|---|---|---|
| | Cathode ray Excitation | Ultraviolet excitation |
| 1.0 | low | 54.5 |
| 2.5 | 78.5 | 88.0 |
| 5.0 | 98.0 | 101.0 |
| 7.0 | 110.0 | 108.0 |
| 10.0 | 100.0 | 100.0 |
| 15.0 | 73.0 | 80.5 |

Example III

A group of phosphors was prepared by the method of Example I wherein the concentration of terbium was 10.0 atomic percent and the ratio, $x$ to $y$, was varied between 1.0 and 3.0. The relative brightness of these phosphors was compared under cathode ray and ultraviolet excitation using the same standard as the phosphor of Example II.

TABLE II

| x/y | Relative brightness (percent) | |
|---|---|---|
| | Cathode ray excitation | Ultraviolet excitation |
| 1.0 | 105 | 106 |
| 1.2 | 100 | 100 |
| 1.6 | 90.5 | 67.5 |
| 1.8 | 87.5 | 67.5 |
| 2.2 | 69.2 | 51.0 |
| 2.4 | 64.8 | 51.0 |
| 3.0 | 59.5 | 41.8 |

What is claimed is:

1. A phosphor system consisting essentially of compositions defined by the formula $(Y_2O_3)_y \cdot (SiO_2)_x$:Tb, wherein the ratio of $x$ to $y$ is from 1 to 3, the atomic percent of terbium substituted for yttrium being between 1.0 and 15.0.

2. The phosphor system defined by claim 1 wherein the ratio of $x$ to $y$ is approximately 1.2.

3. The phosphor system defined by claim 1 wherein the ratio of $x$ to $y$ is approximately 1.2 and approximately 7 atomic percent of the activator terbium is substituted for yttrium.

4. A phosphor composition expressible by the general formulation $xY_2O_3 \cdot ySiO_2$:zTb, the ratio of $x/y$ is from .33/1 to .99/1 and the ratio of $z/y$ is from 0.0033/1 to 0.15/1.

References Cited
UNITED STATES PATENTS

| 3,523,091 | 8/1970 | McAllister | 252—34.4 F |
| 3,186,950 | 6/1965 | Borchardt | 252—301.4 |
| 3,250,722 | 5/1966 | Borchardt | 252—301.4 F |
| 3,373,302 | 3/1968 | Barber | 252—301.4 F |

OTHER REFERENCES

Hansen et al.: Cathodoluminescence of Thin Films Containing Rare Earth Oxides, applied physics letters, vol. 6, No. 3, Feb. 1, 1965, p. 58.

OSCAR R. VERTIZ, Primary Examiner

J. COOPER, Assistant Examiner